April 3, 1956     F. STADELI ET AL     2,740,195
BUTTER APPLICATORS
Filed March 12, 1954
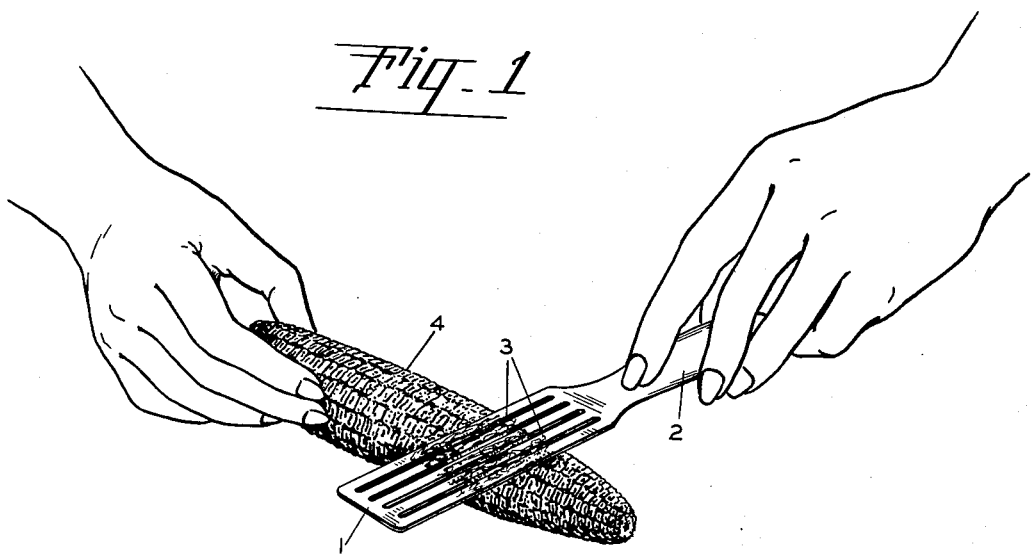
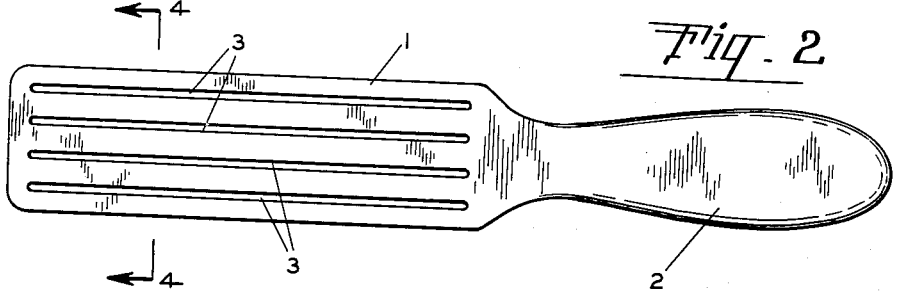
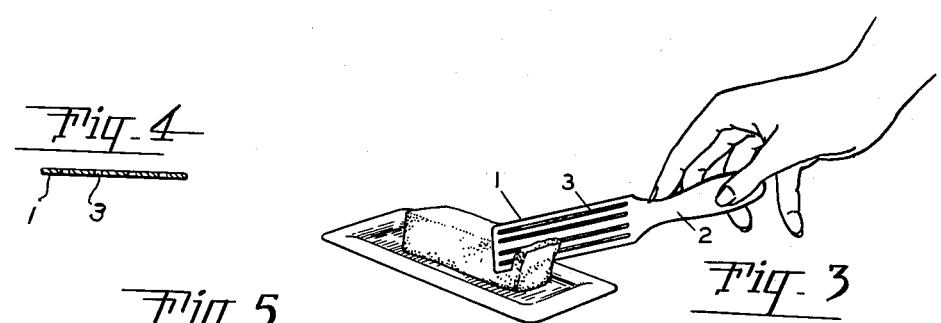
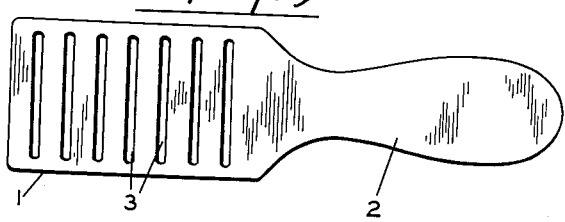
INVENTORS
FRED STADELI
PAUL STAEDELI
BY
*Kimmel & Crowell*
ATTORNEYS

United States Patent Office 2,740,195
Patented Apr. 3, 1956

2,740,195
BUTTER APPLICATORS

Fred Stadeli and Paul Staedeli, Silverton, Oreg.

Application March 12, 1954, Serial No. 415,772

1 Claim. (Cl. 30—115)

Our invention relates to butter applicators and it is particularly adapted to be used for applying butter to ears of corn.

The primary object of the invention is to provide an applicator or blade having slots or holes formed therein, these slots holding butter to the applicator, preventing the same from sliding off the applicator when contacting a hot ear of corn. The applicator can be reversed one way or the other until the butter has been fully applied to the ear of corn.

These and other incidental objects will be apparent in the drawings, specification and claim.

Referring to the drawings:

Figure 1 illustrates how the applicator is used in applying butter to an ear of corn.

Figure 2 is a plan view of the applicator.

Figure 3 shows how the applicator is used in loading the same with butter.

Figure 4 is a sectional end view, taken on line 4—4 of Figure 2.

Figure 5 is another preferred form of mechanical embodiment of our new and improved butter applicator.

Referring more specifically to the drawings:

Our new and improved butter applicator consists of a blade 1, having a handle 2 forming part thereof. Longitudinal slots 3 are formed throughout the length of the blade, or they may run transversely of the blade as indicated in Figure 5. Holes or slots of any shape may be formed in the blade still carrying out the objects of our invention.

It is desirable to have a slight flexibility to the blade, although we do not wish to be limited to any amount of this flexibility. We find that manufacturing the applicator from stainless steel is admirably adapted for the use intended.

In the operation of our new and improved butter applicator, the blade cuts the butter as indicated in Figure 3 from the butter supply. The applicator is turned upside down then so that the butter contacts the ear of corn, as best illustrated in Figure 1. This forces the butter up into the slots 3 preventing the same from slipping off the blade 1, while applying the butter to the ear of corn.

After the applicator has been applied in the above manner to the ear of corn, the same may be reversed to the opposite side, applying the butter that has passed through the slots 3 to the ear of corn.

This same applicator can be used for applying butter to other types of foods, as applying the same to baked potatoes and the like.

We do not wish to be limited to the exact structure, as other mechanical embodiments may be used, still coming within the scope of our claim.

What is claimed is:

A butter applicator comprising an elongated flat blade, and a handle extending from one end of said blade, said blade being flat and having a plurality of spaced apart openings therethrough whereby butter may be received in said openings as the blade is moved over an article of relatively hot food, said openings being elongated and extending lengthwise of said blade.

References Cited in the file of this patent

UNITED STATES PATENTS

| | | |
|---|---|---|
| D. 157,183 | Newell | Feb. 7, 1950 |
| 1,489,419 | Beechlyn | Apr. 8, 1924 |
| 1,997,953 | Van der Kuy | Apr. 16, 1935 |
| 2,641,832 | Champlin | June 16, 1953 |